United States Patent [19]
Nishida et al.

[11] 4,448,518
[45] May 15, 1984

[54] PHOTOSENSITIVE MATERIAL HOLDER FOR AN UPRIGHT PRINTING MACHINE

[75] Inventors: Fumihiko Nishida, Kyoto; Isamu Yamanaka, Mukou; Hiroshi Ijiri, Nagaokakyo, all of Japan

[73] Assignee: Dainippon Screen Seizo Kabushiki Kaisha, Kyoto, Japan

[21] Appl. No.: 343,458

[22] Filed: Jan. 28, 1982

[30] Foreign Application Priority Data

Mar. 25, 1981 [JP] Japan ................................. 56-43781

[51] Int. Cl.³ ............................................. G03B 27/58
[52] U.S. Cl. ........................................ 355/72; 355/18
[58] Field of Search ............................. 355/72, 73, 18

[56] References Cited

U.S. PATENT DOCUMENTS

2,402,107 6/1946 Wekeman ............................. 355/18
2,939,371 6/1960 Schutt et al. ........................ 355/73

FOREIGN PATENT DOCUMENTS

124639 4/1919 United Kingdom .................. 355/72
1190148 4/1970 United Kingdom .................. 355/73

Primary Examiner—Monroe H. Hayes
Attorney, Agent, or Firm—Morganstern and Meaney

[57] ABSTRACT

A photosensitive material holder for an upright printing machine, in which an upright photosensitive material holder plate is adapted to be moved in a direction of its one side, and which includes guide means by which the top of the upright photosensitive material holder plate is inclined rearwards when the upright photosensitive material holder plate is moved to its side direction.

4 Claims, 4 Drawing Figures

PHOTOSENSITIVE MATERIAL HOLDER FOR AN UPRIGHT PRINTING MACHINE

BACKGROUND OF THE INVENTION

The present invention relates to a photosensitive material holder for an upright printing machine.

In a conventional upright printing machine, when a photosensitive material is mounted or demounted to or from an upright holder plate, such a mount or demount operation is obstructed by a picture holder positioned in front of the photosensitive material holder, and hence the upright photosensitive material holder is adapted to be laid down to the horizontal in its rear position or to be moved to one side of the picture holder as the photosensitive material holder is kept in a vertical position.

Accordingly, in this embodiment, a wide operation space is required and the entire size of the printing machine becomes larger, which is inconvenient and requires high cost.

SUMMARY OF THE INVENTION

It is an object of the present invention to provide a photosensitive material holder for an upright printing machine free from the aforementioned inconveniences and disadvantages, which is simple in its construction and is made at a low cost.

According to the present invention there is provided a photosensitive material holder for an upright printing machine, wherein an upright photosensitive material holder plate is adapted to be moved in a direction of its one side, the improvement which comprises guide means by which the top of the upright photosensitive material holder plate is inclined rearwards when the upright photosensitive material holder plate is moved to its side direction.

BRIEF DESCRIPTION OF DRAWINGS

In order that the present invention may be better understood, a preferred embodiment thereof will be described with reference to the accompanying drawings, in which.

DESCRIPTION OF THE PREFERRED EMBODIMENT

Figure 1:
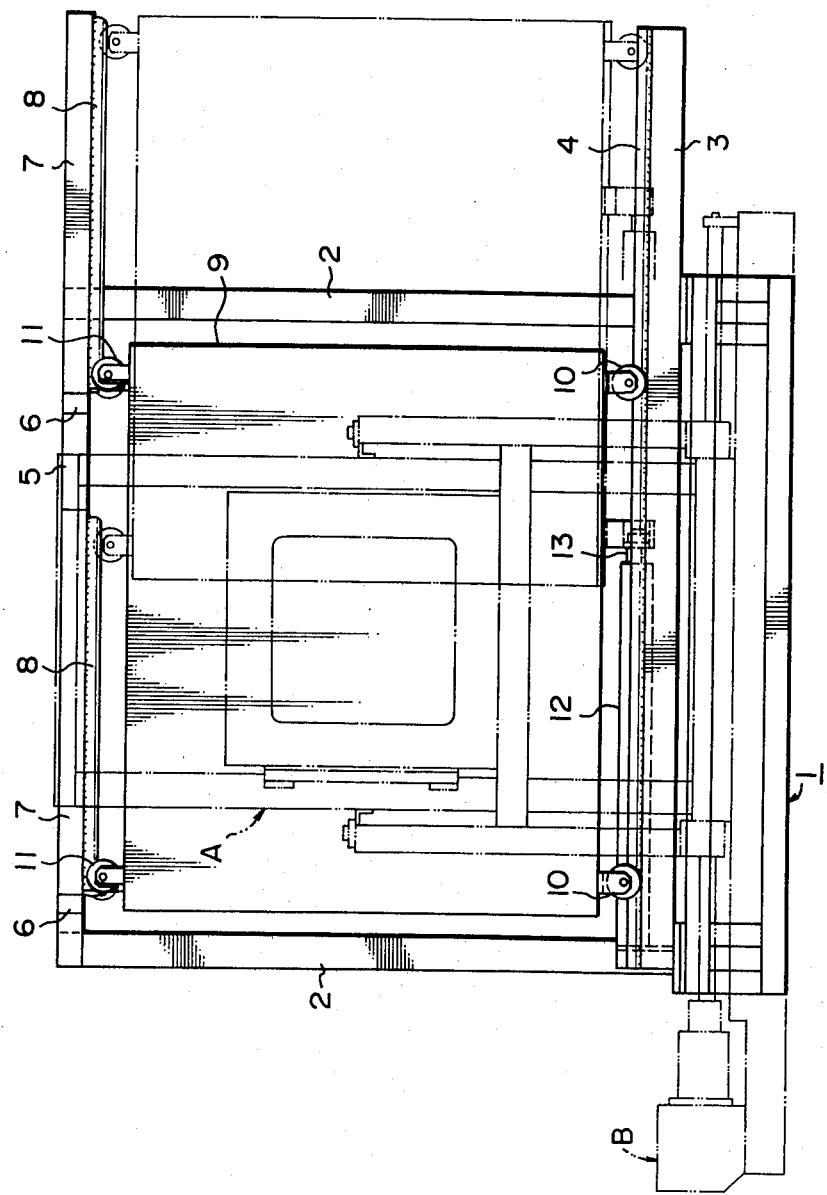
FIG. 1 is an elevation view of a photosensitive material holder for an upright printing machine according to the present invention.
Figure 2:
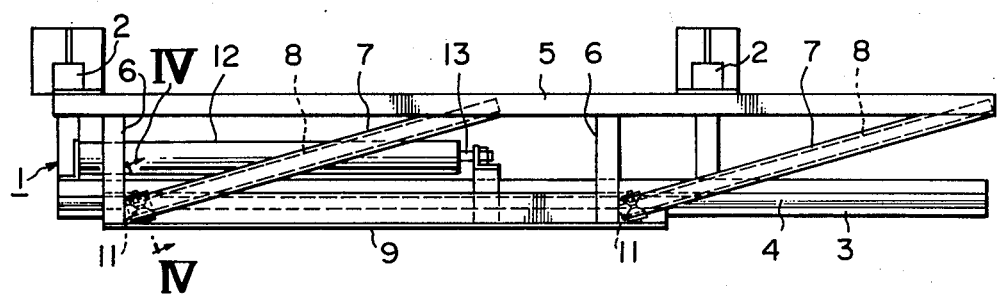
FIG. 2 is a top plan view of FIG. 1.

Referring now to the drawings there is shown in FIGS. 1–4 one embodiment of a photosensitive material holder for an upright printing machine according to the present invention.

Secured to the right and left parts of the rear surface of a base 1 are a pair of upright supports 2. In the upper front end or front surface, a horizontal rail support 3 is mounted onto and extends to the right side direction of the base 1 a certain distance. A lower rail 4 having a round cross section is mounted on the rail support 3 along its entire length.

A beam 5 is horizontally mounted to the upper front surfaces of the upright supports 2 and extends to the right side direction of the upright supports 2 the same distance as the rail support 3. A pair of connection beams extends horizontally forward from the beam 5 in its central and left portions so that the free ends of the connection beams 6 may be positioned right above the lower rail 4.

A pair of upper rail supports 7 extend in parallel from the free ends of the connection beams 6 to the beam 5 and form a certain angle with respect to the connection beams 6. Thus, the beam 5, the connection beams 6 and the upper rail supports 7 form a triangular shape. A guide rail 8 having a round cross section is mounted on the bottom of each upper rail support 7 and extends along the entire length thereof.

A photosensitive material holder plate 9 includes two lower rollers 10 and two upper rollers 11 on the right and left side of the bottom and top sections of the photosensitive material holder plate 9. The lower rollers 10 and the upper rollers 11 may roll on the lower rail 4 and the guide rails 8, respectively, in their longitudinal directions.

An air cylinder 12 having a piston rod 13 therein is mounted horizontally to the left side of the base 1 with the left end of the air cylinder 12 positioned in parallel with the base 1, and the free end of the piston rod 13 is connected to the rear lower end of the photosensitive material holder plate 9.

An upright picture holder support A including an upright picture holder is arranged in front of the photosensitive material holder plate 9, and a drive means B for driving the picture holder in the horizontal and vertical directions is mounted to one side of the upright picture holder support A.

Figure 3:
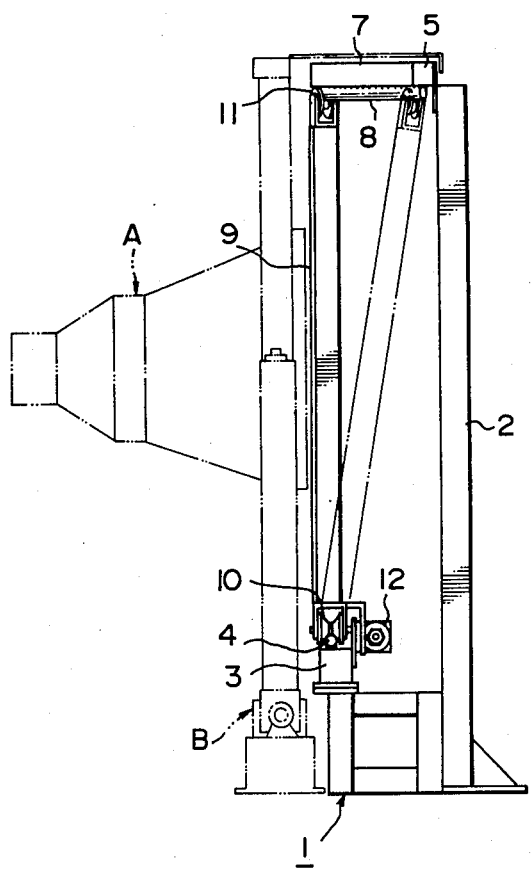
FIG. 3 is a right side elevational view of FIG. 1.
Figure 4:
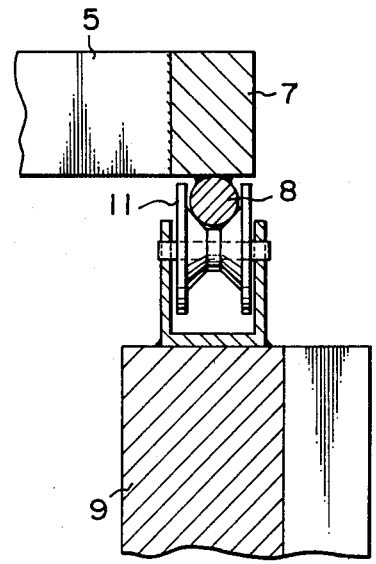
FIG. 4 is an enlarged longitudinal cross-section, taken along the line IV—IV of FIG. 2.

In this embodiment described above, when the photosensitive material is mounted or demounted to or from the photosensitive material holder plate 9, the air cylinder 12 is actuated to advance the piston rod 13, thereby moving the photosensitive material holder plate 9 to the right side direction thereof along the lower rail 4 and the guide rails 8, while the top of the upright photosensitive material holder plate 9 is inclined rearwards, as shown by two-dotted lines in FIG. 3.

With the top of the photosensitive material holder plate 9 inclined rearwards, the photosensitive material mount or demount operation can be easily done, without moving the entire photosensitive material holder plate 9 from the front of the upright picture holder to the side position thereof.

In this embodiment, the grooves of the upper rollers 11 have sufficient depth such that the upper rollers 11 may not come off the guide rails 8 when the photosensitive material holder plate 9 is inclined rearwards.

Although the present invention has been described in some detail by way of illustration and example for purposes of clarity of understanding, it will, of course, be understood that various changes and modifications may be made in the form, details, and arrangements of the parts without departing from the scope of the present invention as set forth in the following claims.

What is claimed is:

1. In an apparatus of the type for exposing a photosensitive material comprising a holder for holding photosensitive material in an operative position for exposure and means to facilitate loading and unloading photosensitive material the improvement comprising;

a substantially flat holder having transport guide means located near its top edge and its bottom edge, said holder being adapted to be transported between a first position for exposure of photosensitive material mounted thereon and a second position for loading and unloading of photosensitive material, a support structure having a lower guide supporting means which extends laterally between the first position and the second position and an upper guide supporting means spaced from the lower guide supporting means which extends from the first position at an angle to the lower guide supporting means rearwardly of the lower guide supporting means to the second position, the holder being moveably mounted between the first and second positions by the bottom edge guide means being transportable along the lower guide supporting means and the top edge guide means being transportable along the upper guide supporting means, whereby upon moving the holder from the first position to the second position, the bottom edge is transposed laterally while the top edge is transported simultaneously laterally and rearwardly to rotate the top edge relative to the bottom edge causing the material holder to be rearwardly inclined when in the second position.

2. The apparatus of claim 1 wherein the transport guide means near the top and bottom edges of the holder are guide rollers and wherein the lower guide supporting means is a guide rail and the upper guide supporting means is a plurality of guide rails extending in parallel rearwardly at an angle to the lower guide supporting means.

3. The apparatus of claim 1 further including means operatively coupled to the holder for causing transport of the holder between the first position and the second position.

4. In an apparatus of the type for exposing a photosensitive material comprising a holder for holding photosensitive material in an operative position for exposure and means to facilitate loading and unloading photosensitive material the improvement comprising;

means for transporting the holder between a first position for exposure of photosensitive material mounted thereon and a second position for loading and unloading of photosensitive material comprising;

means for guiding the bottom of the holder laterally between the first position and the second position, means for guiding the top of the holder simultaneously laterally and rearwardly of the first position to the second position and simultaneously laterally and forwardly of the second position to the first position, said guiding means being operable to guide the holder between the second position and the first position, whereby upon moving the holder from the first position to the second position, the bottom edge is transported laterally while the top edge is transported simultaneously laterally and rearwardly to rotate the top edge relative to the bottom edge causing the material holder to be rearwardly inclined when in the second position.

* * * * *